Patented Nov. 4, 1952

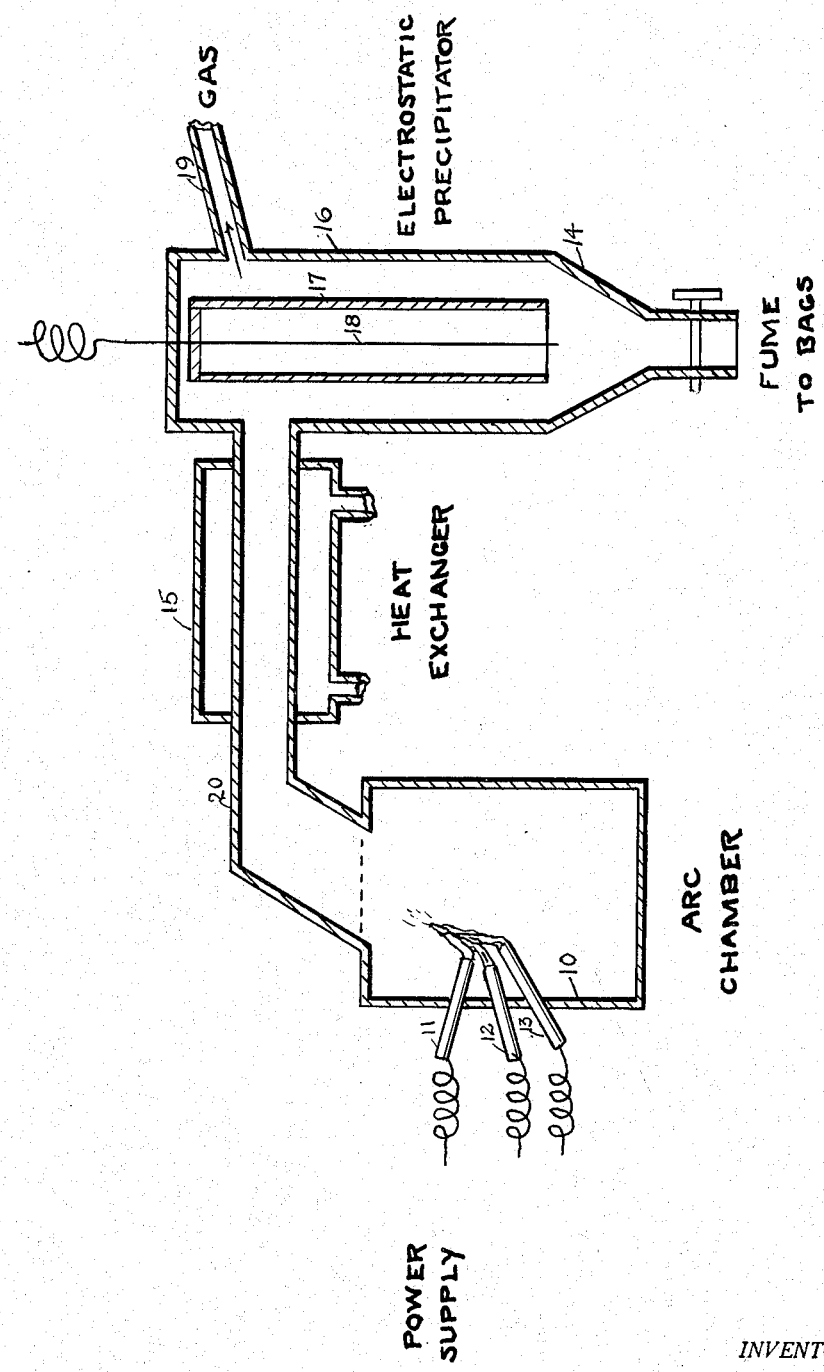

2,616,842

UNITED STATES PATENT OFFICE 2,616,842

ARC PROCESS FOR THE PRODUCTION OF FUME

Charles Sheer, New York, and Samuel Korman, Brooklyn, N. Y.

Application January 13, 1951, Serial No. 205,936

3 Claims. (Cl. 204—164)

This is a process for the production of a refractory substance in very finely divided form commonly known as a fume. Practical uses for the process include the reduction of cement ingredients to extremely finely divided form or to reduce a substance such as silica to a fume form. This latter substance will be used herein as the substance to be converted as a specific example. It is possible by the process to produce such materials having particle sizes ranging from 10 to 100 milli-microns in diameter.

This process depends upon the peculiar property of a high erosion arc, of vaporizing and ionizing refractory matter such as siliceous matter contained in the electrode of the arc, even though such material is extremely refractory. The process depends upon the fact also that if this vaporized silica is rapidly condensed and collected without subjecting it to chemical combination, it may be recovered in the form of the fume described.

This case is a companion case to the following other applications of the same applicants: Ser. No. 765,148, filed July 31, 1947, for Process of Reducing Refractory Ores, and Ser. No. 47,425, filed September 2, 1948, for Process of Treating Ores.

Silica fume is the name commercially applied to very finely divided silica, or silicon dioxide. In chemical composition it is identical with ordinary white sand, which furnishes the main raw material for its production, but in physical form it is fundamentally different. A characteristic feature of the fume is its minute particle size, but it probably differs also from sand in its physical properties.

One principal commercial use of silica fume is as a compounding ingredient in the production of rubber. In the manufacture of rubber, silica fume is used as a reinforcing agent. When in proper physical condition this process produces, the fume yields a superior grade of rubber. It has also the distinct advantage that it permits the manufacture of rubber tires or similar articles in white, or any color desired, because the product itself is colorless or white.

It is today produced by first synthesizing an organic silicate, such as ethyl silicate, and then burning this compound under conditions to produce the fume. Such a process is inherently costly.

The production of a fume in accordance with this process is accomplished by making electrodes of the siliceous material, such as white sand, with carbon, and operating a high erosion arc between such electrodes to produce a jet of vaporized material, under conditions which will cause the fume to condense without chemical alteration.

This invention accordingly comprises a method comprising the advantages and accomplishing results and involving the relationship of the steps one to another, which will be exemplified in the method herein described and the scope of the application of the invention will be indicated in the claims.

For a fuller understanding of the nature and objects of the invention, reference should be had to the following detailed description taken in connection with the accompanying drawing, in which the figure is an elevation of the apparatus to produce the fume.

The high erosion arc here referred to and employed in this process is of the same general nature as the "high intensity" arc as the term is used in the literature following the nomenclature introduced by Bassett and Sperry. The arc was developed by them for use in search lights, and they gave it its name because of the high intensity of illumination that results as soon as the transition point is passed. In the lighting industry however, the erosion of the electrodes was a dead loss, and the intensity of light only was desired. The erosion was therefore kept to the minimum. The high erosion arc of this process is an arc of similar character, but in which the light is a loss and the erosion is brought to the maximum.

The high intensity arc (including the high erosion arc) is an entirely different electrical phenomena from the common arc. It comes into being as a sudden transition from the common arc when current densities at the anode face are employed which exceed a critical value. This change in kind of phenomenon is analogous to the change which occurs at much lower current densities in the transition from a glow discharge to a common arc, which transition also occurs suddenly when the current density exceeds a critical point.

The location of the critical point in both cases depends upon a variety of factors but in any given case the critical point is sharply shown and easily recognized by the marked changes in appearance and basic properties of the discharge. These changes all occur at the transition point and are the direct result of the difference of functioning of the two arcs.

The term high intensity or high erosion are not too felicitous and must not cause confusion between this new type of arc and a common arc using a high current, since it is possible to operate a common arc with thousands of amperes without getting the high erosion effect, and on the other hand the high erosion effect may be obtained with currents as low as 10 amperes with very small electrodes.

The markedly new characteristics which come into being with high erosion arc, when the current density exceeds the critical point, include the following:

In the normal arc, the crater of the anode, which is the hottest portion of the arc, reaches a temperature not greater than 3600° C. This temperature is not sufficient to cause more than a negligible vaporization of the anode. The energy is dissipated predominately in the form of radiation, and the erosion of the anode that occurs in air is almost wholly a slow oxidation of the solid incandescent carbon. In the new arc the temperature jumps to between 7000 and 10,000° C. At that temperature the entire electrode including the carbon is vaporized at great speed, resulting in a superheated region of extremely brilliant gases immediately before the anode face which obscure the anode and in turn become an exceedingly luminous source of light. It is the high light intensity of these vapors which first gave the new arc its name.

The result of this vaporization is also the emission from the anode of a high velocity jet of brilliantly luminous, highly ionized vapor which shoots off out of the path of the current stream at a velocity of the order of one sixth the velocity of sound. This brilliant jet may extend out as much as two feet from the electrode, although the electrode spacing may not be more than an inch.

Another of the characteristics which come into being at the critical point is a very sharp rise in the rate of erosion of the electrodes. With the common arc the energy is largely converted into radiant energy, and an increase in energy input within that range does not make a corresponding increase in the rate of erosion. As soon as the critical point of current density is reached, however, the very sharp bend occurs upward in the curve between power input and erosion rate, and the erosion becomes substantially proportional to the power input.

There also occurs with these phenomena a marked change in the volt-ampere curve of the discharge. In the normal arc range an increase in current is accompanied by a decrease in the voltage across the arc. Such an arc therefore requires a ballast for operation. This is spoken of as a negative resistance characteristic.

Within the range of the high erosion arc, however, the arc acts like any normal resistance, requiring additional voltage to send more current. This is commonly referred to as a positive resistance characteristic. This sudden change from negative to positive resistance characteristic is therefore another feature by which the high erosion arc can be distinguished from the common arc.

In carrying out this process, the first step is the formation of electrodes composed principally of the siliceous materials, with sufficient carbon to render the electrode conductive usually with a bonding agent. We have used electrodes comprising about 84% of the material to be treated with 15% carbon and with a suitable binder. These materials are thoroughly mixed and extruded to form green electrodes, preferably by a plunger extruder. Better electrodes are obtained if the extrusion is done under low gaseous pressure, since this permits the formation of dense electrodes without gas occlusion.

The electrodes after extrusion are baked at a temperature sufficient to carbonize the volatile organic matter in the carbon source and cause good bonding of the materials to make the electrode homogeneous, having low resistivity. This temperature of baking will vary somewhat, depending in part upon the material that is being treated, and in part upon what particular form of carbon and what binding agent is employed.

We have found that when the bituminous coals of West Virginia, containing about 20% volatile carbonaceous matter, are used with sand, the preferable baking temperature is about 1500° C. for from ten to thirty minutes. This baking is conducted in such a manner as to avoid oxidation of the carbon of the electrode. We have conducted the baking in graphite molds in which the electrodes were completely enclosed.

The electrodes are then used as the electrodes of a high erosion arc, which may be burned in air. In this case the carbon content is completely removed from the product by oxidation. Such an arc produces a high evaporation of the electrode material. This vaporized material in the case of sand condenses to liquid form at substantially 2200° C. to form a fog, which solidifies as solid particles at about 1500° C. It passes through these temperatures quickly and apparently without opportunity for the particles to coalesce or crystallize before solidification. It is a property of the high erosion arc that the vapors issuing from it are extensively ionized. There is, therefore, a high density of electrical charges in the vapor stream, which are well-known to be very effective as nuclei of condensation. These serve as centers for the condensation of the cooling vapors, and are present in such multiplicity as to facilitate the condensation of the vapors into a fine fume. This results in a much higher degree of comminution than is otherwise possible, and the residual charge on the fine particles greatly facilitates their collection by electrostatic precipitation. The product takes the form of very small spherical particles as seen with the aid of the electron microscope, ranging in diameter from ten to one hundred milli-microns. By reason of their spherical form these particles have no abrasive properties, and thereby provide a longer lasting rubber, and they are probably amorphous rather than crystalline in form.

Referring now to the drawing, the numeral 10 represents a chamber having three electrodes 11, 12 and 13 extending into it, but insulated from it. This drawing is conventional only and any particular form of holders for the electrodes which will carry the high currents and provide for the rapid rate of feed may be used.

The arc is then struck between these electrodes at the very high current densities required to produce the high erosion effect. This effect is the rapid evaporation of the electrodes to produce a jet of vaporized material projected away from the electrodes. Theoretically, therefore, if direct current were available, it would be sufficient to put the material in the anode only. In practical operation, however, it is simpler to use alternating current because of its flexibility, so that for commercial reasons we prefer to use a three phase A. C. arc having all of the electrodes of the composition we have described.

When the high erosion arc is maintained with alternating current, the electrodes alternate as anodes, the resulting arc being in effect a succession of high intensity D. C. arcs of alternating polarity.

In practice by this process it has been found that with electrodes having a diameter of 16 mm. and a 16 kilowatt arc, with 200 amperes and 80 volts, the fume may be produced with a power consumption of 3 kwh. per pound of fume.

These vapors, which are luminous as they leave the arc crater, being visible as a "tail flame" projecting from a few inches to several feet (depending upon the size of the arc) beyond the crater, lose most of their energy by radiation to the walls of the arc chamber. Thus, despite the high velocity with which the vapors are ejected from the arc—$1/3$ to $1/2$ the velocity of sound—the temperature gradient is so rapid that by the time the vapor has reached the tip of the tail flame the silica has already condensed to the solid state, and a steady stream of fume may be observed issuing from the tip of the flame. In practice however, the gas stream, consisting of a mixture of air and $CO_2$, must be cooled further in order to accomplish the collection at a reasonable temperature. This is shown diagrammatically as being performed by the heat exchanger 15.

The collection system is here shown in the form of a Cottrell precipitator, having a casing 16 and an inner shell 17 and an electrode 18, all concentric with each other, the shell 17 being open at the bottom and having near its top an outlet 19 for gases and vapors of materials which are not condensed.

At the bottom of the precipitator is some control means 20 for closing off the chamber or for permitting the withdrawal of the precipitating contents. These devices are standard apparatus and may take any standard form. The shell 17 and the electrode 18 are oppositely charged electrically in the usual manner for Cottrell precipitators, and the shell 17 terminates short of the bottom of the casing 14. In this way the gases going in from the connecting piece 20 with the fume, comprising chiefly air and oxides of carbon, may pass downwardly through the precipitator and upwardly through the shell 17 and out through the outlet 19. The fume evolved from the arc is electrically charged and this facilitates their separation by the electrostatic precipitator.

The size of the particles produced is in part determined by the speed with which the gases are cooled to precipitation point. This in turn will depend upon the length of the tail flame and, therefore, upon the operating characteristics of the arc. However, the tail flame may be regulated independent of the arc operation by directing a stream of air at it so as to obtain virtually any size distributions desired over a wide range.

The operation of the process will be clear from the above description. The arc is established and maintained between the electrodes 11, 12 and 13, which are preferably formed of the mixture of the material to be vaporized and carbon substantially as specified.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which as a matter of language might be said to fall therebetween.

What is claimed is:

1. The process of forming a fume from a refractory material, which comprises forming an electrode from a mixture of substantially 85% of the material with about 15% of a coking carbon and maintaining an arc in air with such electrode as anode at a current density at the anode face in excess of the transition point where the tail flame of luminous vapor, projected from the anode, appears and the resistance characteristic of the arc changes from negative to positive, and then condensing the vapors and collecting the fume thus formed.

2. The process of forming a fume from silica, which comprises forming an electrode from a mixture of substantially 85% of the silica with about 15% of carbon and maintaining an arc in air with such electrode as anode at a current density at the anode face in excess of the transition point where the tail flame of luminous vapor, projected from the anode, appears and the resistance characteristic of the arc changes from negative to positive, and then condensing the vapors and collecting the fume thus formed.

3. The process of producing a cement in fume form, which comprises mixing the ground ingredients in proportions to form the cement, then forming an electrode from a mixture of said ingredients with about 15% carbon added to render it conductive and then maintaining an arc in air with such electrode as anode at a current density at the anode face in excess of the transition point where the tail flame of luminous vapor, projected from the anode, appears and the resistance characteristic of the arc changes from negative to positive, and then condensing the vapors and collecting the fume thus formed.

CHARLES SHEER.
SAMUEL KORMAN.

REFERENCES CITED

The following references are of record in the file of this patent:

UNITED STATES PATENTS

| Number | Name | Date |
|---|---|---|
| 693,482 | Acheson | Feb. 18, 1902 |
| 1,054,372 | Tone et al. | Feb. 25, 1913 |
| 1,418,528 | Burgess | June 6, 1922 |
| 1,650,894 | Koehler | Nov. 29, 1927 |
| 1,752,936 | Austin et al. | Apr. 1, 1930 |
| 1,982,012 | Mingard | Nov. 27, 1934 |
| 2,184,885 | Muskat et al. | Dec. 26, 1939 |
| 2,306,184 | Pechukas | Dec. 22, 1942 |
| 2,399,687 | McNabb | May 7, 1946 |